United States Patent [19]

Ichiko et al.

[11] 4,134,772

[45] Jan. 16, 1979

[54] METHOD OF PRODUCING SOFT PORCELAIN

[75] Inventors: Tadatoshi Ichiko; Takeo Isono; Keiichi Mochizuki, all of Nagoyashi, Japan

[73] Assignee: Narumi Seito Kabushiki Kaisha, Nagoyashi, Japan

[21] Appl. No.: 833,677

[22] Filed: Sep. 15, 1977

[30] Foreign Application Priority Data

Oct. 21, 1976 [JP] Japan .................. 51/125447

[51] Int. Cl.$^2$ ........................................... C04B 33/24
[52] U.S. Cl. ........................................ 106/45; 423/305
[58] Field of Search .................................. 106/45, 46

[56] References Cited

U.S. PATENT DOCUMENTS 3,893,841  7/1975  Nijhawan et al. ................. 106/45

FOREIGN PATENT DOCUMENTS 41-3459  2/1966  Japan ................................. 106/45

46-28404  8/1971  Japan ................................. 106/45

OTHER PUBLICATIONS

Hackh's Chemical Dictionary–4th Ed.–Pub. 1969 by McGraw–Hill, Inc., N.Y.C.–pp. 124–125 and 537.
Ceramic Industry–Jan. 1967, p. 137, "Sericite".

Primary Examiner—Helen McCarthy
Attorney, Agent, or Firm—Blanchard, Flynn, Thiel, Boutell & Tanis

[57] ABSTRACT

A method of producing soft porcelain wherein one raw material of the porcelain, $\beta$-calcium pyrophosphate, is obtained by heating uniformly bone phosphate, which is a by-product of gelatin production from cattle bones, at a temperature of 1,000° to 1,250° C so as to completely convert it to $\beta$-calcium pyrophosphate, and a green body consisting of the thus obtained $\beta$-calcium pyrophosphate, limestone, sericite, kaolin, feldspar and quartz is prepared and then is subjected to oxidation firing.

6 Claims, No Drawings

METHOD OF PRODUCING SOFT PORCELAIN

BACKGROUND OF THE INVENTION

This invention relates to an improved method of producing soft porcelain characterized by whiteness and elegant translucency by using a minimum amount of bone phosphate, which is a by-product of the process of producing gelatin from ox bones.

Conventionally, when bone china, which is a representative soft porcelain, is produced, bone ash (calcined ox bone), namely $3Ca_3(PO_4).Ca(OH)_2$, is used as a main raw material. However, the production of bone ash involves many difficulties in the selection of the raw material and in the firing method.

Thus, a method capable of obtaining easily and cheaply a raw material, which is more stable in quality than bone ash, has been investigated. It has been found that bone phosphate which can be obtained in the course of producing gelatin from cattle bones by treating it with hydrogen chloride and separating the gelatin component and neutralizing the remaining waste liquid with milk of lime, can be used instead of bone ash since the impurities contained in the thus obtained bone phosphate are small in quantity. There are several methods of producing soft porcelain by use of the thus obtained bone phosphate. One of the most advanced methods is disclosed in Japanese Pat. No. 679,226. The method of preparing a green body in this patent is characterized by calcining the by-product bone phosphate at temperatures of 1,000° to 1,250° C. to convert it to calcined bone phosphate, which is slightly soluble in water, followed by mixing (a) 28 to 40 wt% of the calcined bone phosphate, (b) 6 to 14 wt% of limestone, (c) 20 to 35 wt% of kaolin (part of which can be replaced by "Gairome-clay"), (d) not more than 15 wt% of china stone, (e) 5 to 30 wt% of feldspar, and (f) 0 to 10 wt% of quartz.

The conventional calcined bone phosphate, is a mixture of calcium phosphate component and a comparatively large quantity of $\beta$-calcium pyrophosphate, which is obtained by calcining bone phosphate at temperatures of 1,000° to 1,250° C. The calcined bone phosphate, mixed in a green body, is apt to produce foam in the body while it is fired since the calcium phosphate component other than $\beta$-calcium pyrophosphate, undergoes changes during the firing process.

SUMMARY OF THE INVENTION

The purpose of the present invention is to reduce the amount of calcined bone phosphate used previously, not less than 28 wt% of it was required. Also another purpose is to provide an improvement in the above-mentioned patent, and to make it possible to produce white soft porcelain with an elegant translucency by converting the calcined bone phosphate completely to $\beta$-calcium pyrophosphate so that the mixing ratio of $\beta$-calcium pyrophosphate is 15 to 28 wt% in relationship with other components of the raw materials of the porcelain.

According to the present invention, the amount of bone phosphate used, which is cheaper than bone ash, but is more expensive than the ordinary porcelain raw materials, is decreased and accordingly the cost of the raw materials is reduced. Moreover, the soft porcelain obtained has a higher strength than the ordinary bone china, and it is by no means inferior to the ordinary bone china in whiteness and translucency.

Furthermore, by reducing the amount of bone phosphate used, which is a non-plastic raw material, additional plastic raw materials can be used so that the molding of the green body can be performed satisfactorily. Due to the use of sericite, which is a flux auxiliary agent, the firing temperature range is expanded and the translucency is improved. Also due to the use of quartz, the firing temperature range is expanded and control of the firing becomes easier.

DETAILED DESCRIPTION OF THE PREFERRED EMBODIMENTS

In the present invention, bone phosphate, which is a by-product of gelatin production, is completely converted to $\beta$-calcium pyrophosphate by a uniform heat treatment at temperatures of 1,000° to 1,250° C. in order to use the converted $\beta$-calcium pyrophosphate. This is the first feature of this invention.

Furthermore, in the present invention, in order to obviate the production of foam during the firing process bone phosphate is treated uniformly in the temperature range of 1,000° to 1,250° C. in an appropriate reactor, for example, in a rotary kiln. Thus all the crystal phases of the bone phosphate are converted to $\beta$-calcium pyrophosphate so that the mixing ratio of calcined bone phosphate can be reduced in comparison with the conventional ratio of calcined bone phosphate. As a result, the reaction of $\beta$-calcium pyrophosphate with the lime component in the fired body, and the reaction of the lime component with silicate minerals, are stabilized. Thus the determination and adjustment of firing temperatures can be readily made.

Furthermore, as the amount of plastic raw materials (for example, "Gairome-clay") in the green body is increased, the plasticity of the green body is also increased. This is effective in making the shaping of the body easier.

In the present invention, sericite is used, which is an important agent as a flux in the firing process. This is the second feature of this invention.

China stone, which was conventionally used, is a mixture comprising 10 to 40% of sericite and kaolin and 60 to 90% of quartz. By replacing china stone with sericite, vitrification in the firing process can be stabilized and moreover, an excellent translucency can be obtained.

Furthermore, in the present invention, quartz is used as an indispensable component. This is the third feature of this invention. In the green body according to the present invention, quartz particularly has an effect of gradually promoting the formation of matrix glass in the firing process, with the result being that the temperature range, in which the maximum shrinkage occurs, is expanded. The examples according to the present invention are shown below:

Table 1

| | | | | | | |
|---|---|---|---|---|---|---|
| $\beta$-calcium Pyrophosphate | 15 | 20 | 23 | 25 | 27 | 28 |
| Limestone | 18 | 13 | 14 | 14 | 15 | 6 |
| Sericite | 15 | 10 | 15 | 10 | 10 | 5 |
| Kaolin | 15 | 20 | 15 | 15 | 15 | 25 |
| Gairome Clay | 7 | 20 | 5 | 15 | 14 | 15 |

Table 1-continued

| | | | | | | |
|---|---|---|---|---|---|---|
| Feldspar | 15 | 7 | 18 | 10 | 9 | 20 |
| Quartz | 15 | 10 | 10 | 11 | 10 | 1 |
| Firing Temp. (° C) | 1,320–1,350 | 1,270–1,300 | 1,240–1,260 | 1,240–1,270 | 1,250–1,280 | 1,200–1,210 |
| Whiteness | 90.0 | 92.9 | 93.0 | 93.2 | 94.3 | 92.5 |
| Translucency | 38.7 | 39.1 | 40.0 | 40.3 | 40.8 | 38.9 |
| Transverse Strength (Kg/cm$^2$) | 1,070 | 1,190 | 1,280 | 1,300 | 1,350 | 1,140 |
| Commercial Bone China Products | Whiteness Translucency Transverse Strength | | 90–93 38–39 1,100–1,200 Kg/cm$^2$ | | | |

As shown in Table 1, the respective bodies made with the respective combinations of the components were subjected to oxidation firing in an appropriate range of temperatures, and after glazing, the bodies were subjected to firing at temperatures of 1,100° to 1,150° C., with the result being that soft porcelain, having whiteness and translucency similar to the conventional bone china and a high transverse strength, was obtained.

The reason why the heat treatment temperatures of bone phosphate were set in the range between 1,000° and 1,250° C. in the present invention is that it is difficult to perform an industrial production of β-calcium pyrophosphate below 1,000° C., while above 1,250° C., ξ-calcium pyrophosphate having a different crystal form from that of β-calcium pyrophosphate, is formed, which causes an unsuitable fusing.

The reason why the mixing ratio of β-calcium pyrophosphate was set between 15 and 28 wt% was that the purpose of the present invention is to reduce the mixing ratio to 28 wt% or less, but elegant white porcelain with excellent translucency cannot be obtained below 15 wt%.

Limestone in the presence of β-calcium pyrophosphate lowers the firing temperatures by the action of lime component and phosphoric component to silicate minerals and narrows the firing temperature range when the content of limestone is below 6 wt%. However, when the content is above 18 wt%, a difficulty is caused in firing control since the excessive lime component reacts with silicate minerals.

When the content of sericite is below 5 wt%, a satisfactory translucency cannot be obtained, while above 15 wt%, sericite works excessively as a flux and softens the body, thus the firing becomes difficult.

When the content of kaolin is below 20 wt%, the plasticity of the green body is lowered and the molding characteric thereof becomes poor. However, when the content of kaolin is above 40 wt%, the translucency of the fired body is lessened.

With respect to feldspar, even if it is used together with sericite, a satisfactory translucency cannot be obtained when the content is below 5 wt%. However, when the content is above 20 wt%, feldspar works excessively as a flux so that the firing of the body becomes difficult.

When the content of quartz is above 15 wt%, it becomes difficult to fuse completely in the fired body, with the result being that the strength of the body is lowered. When the content is below 1 wt%, the above-mentioned effects of quartz cannot be attained.

According to the present invention, the appropriate firing temperatures of the body is 1,200° to 1,350° C. Below 1,200° C., the firing reaction does not proceed sufficiently in the body so that the porcelain cannot be produced. On the other hand, when the firing temperatures are above 1,350° C., the body is softened so that the shape of the product cannot be maintained.

The firing atmosphere for this soft porcelain must be an oxidation firing atmosphere. Otherwise, the reaction does not proceed completely, and a high quality soft porcelain cannot be produced.

What is claimed is:

1. A method of preparing soft porcelain, which comprises subjecting to oxidation firing, at a temperature of from 1200° to 1350° C., a shaped green body made of a mixture consisting essentially of
   (a) from 15 to 28 percent by weight of β-calcium pyrophosphate, prepared by uniformly calcining bone phosphate at a temperature of from 1000° to 1250° C. to convert it completely to β-calcium pyrophosphate, whereby the production of foam during the oxidation firing is obviated,
   (b) from 6 to 18 percent by weight of limestone,
   (c) from 5 to 15 percent by weight of sericite,
   (d) from 20 to 40 percent by weight of kaolin or mixture of kaolin and Gairome clay,
   (e) from 5 to 20 percent by weight of feldspar, and
   (f) from 1 to 15 percent by weight of quartz.

2. A method according to claim 1 in which the calcining of the bone phosphate is performed in a rotary kiln.

3. A method according to claim 1 in which the mixture consists essentially of
   (a) about 20 percent by weight of β-calcium pyrophosphate,
   (b) about 13 percent by weight of limestone,
   (c) about 10 percent by weight of sericite,
   (d) about 20 percent by weight of kaolin and about 20 percent by weight of Gairome clay,
   (e) about 7 percent by weight of feldspar, and
   (f) about 10 percent by weight of quartz.

4. A method according to claim 1 in which the mixture consists essentially of
   (a) about 23 percent by weight of β-calcium pyrophosphate,
   (b) about 14 percent by weight of limestone,
   (c) about 15 percent by weight of sericite,
   (d) about 15 percent by weight of kaolin and about 5 percent by weight of Gairome clay,
   (e) about 18 percent by weight of feldspar, and
   (f) about 10 percent by weight of quartz.

5. A method according to claim 1 in which the mixture consists essentially of
   (a) about 25 percent by weight of β-calcium pyrophosphate,
   (b) about 14 percent by weight of limestone,
   (c) about 10 percent by weight of sericite,
   (d) about 15 percent by weight of kaolin and about 15 percent by weight of Gairome clay,
   (e) about 10 percent by weight of feldspar, and
   (f) about 11 percent by weight of quartz.

6. A method according to claim 1 in which the mixture consists essentially of
(a) about 27 percent by weight of β-calcium pyrophosphate,
(b) about 15 percent by weight of limestone,
(c) about 10 percent by weight of sericite,
(d) about 15 percent by weight of kaolin and about 14 percent by weight of Gairome clay,
(e) about 9 percent by weight of feldspar, and
(f) about 10 percent by weight of quartz.

* * * * *